United States Patent [19]
Nakata et al.

[11] 3,801,730
[45] Apr. 2, 1974

[54] HIGH VOLTAGE CABLE SPLICE WITH PROVISION FOR TESTING THE INSULATION THEREOF AND METHOD OF MAKING SAME

[75] Inventors: Roy Nakata, Pittsfield, Mass.; Mid Ouyang, Drexel Hill, Pa.; Wendell T. Starr, Los Altos Hills, Calif.

[73] Assignee: General Electric Company, Philadelphia, Pa.

[22] Filed: May 23, 1973

[21] Appl. No.: 363,303

[52] U.S. Cl................ 174/73 R, 29/593, 29/628, 156/49, 174/11 BH, 174/88 R, 324/54
[51] Int. Cl..... H02g 15/08, H02g 1/14, G01r 31/20
[58] Field of Search.......... 174/11 BH, 73 R, 73 SC, 174/76, 88 R, 88 C, 142, 143; 29/593, 628, 630 F; 156/49; 324/54, 60 R

[56] References Cited
UNITED STATES PATENTS
1,975,226   10/1934   DeZoeten ............... 174/88 R X
3,390,331   6/1968   Brown et al. ............ 174/11 BH UX FOREIGN PATENTS OR APPLICATIONS
620,822   3/1949   Great Britain ............... 174/142

*Primary Examiner*—Laramie E. Askin
*Attorney, Agent, or Firm*—William Freedman; J. Wesley Haubner

[57] ABSTRACT

A cable splice is constructed in such a way that insulant within the splice can be checked by means of a high potential applied thereto without stressing the previously-existing cable insulation in locations outside the splice.

About suitably prepared ends of two cable sections, there is molded a tubular section of insulant having a tubular metal sleeve imbedded in the insulant near its outer periphery. The insulant has a first external surface portion surrounding the imbedded sleeve and second and third surface portions extending, respectively, between the ends of the first surface portion and the metal sheaths of the cable sections. Tubular metal shielding is applied to the first surface portion in a position to surround the ends of the sleeve. Semiconductive voltage-grading coatings are applied to the second and third surface portions to electrically interconnect the shielding and the sheaths.

The electrical properties of the splice are then tested by applying a high potential test voltage between the imbedded sleeve and the cable conductor while the cable conductor and cable sheaths are maintained at ground potential and the shielding is maintained at substantially the potential of the imbedded sleeve. After this testing, low resistance electrical connections are provided between the shielding and the metal sheaths.

12 Claims, 6 Drawing Figures

HIGH VOLTAGE CABLE SPLICE WITH PROVISION FOR TESTING THE INSULATION THEREOF AND METHOD OF MAKING SAME

BACKGROUND

This invention relates to a cable splice for joining together two sections of high voltage cable and, more particularly, relates to a splice of this type that can be readily tested for electrical properties both during its manufacture and when in service. The invention also relates to a method of making such a splice.

The type of cable that we are concerned with comprises a conductor, insulation surrounding the conductor, and a tubular metal sheath surrounding the insulation. A known procedure for splicing together sections of such cable involves the following steps. Insulation is removed from the end of each cable section to provide an exposed conductor end, and metal sheath is removed from the end of the insulation to provide an exposed section of insulation projecting past the end of the metal sheath. The exposed conductor ends are then suitably joined together by connecting means providing a good electrical and mechanical connection therebetween. Then a mold is placed around the connecting means and the exposed insulation of the two cable sections, and thereafter hot thermoplastic insulant in fluid form is injected into the mold. The insulant has a high affinity for metal and for the exposed insulation, and, upon cooling and setting, bonds to the metal and exposed insulation. Sometimes the surface of the cable-section insulation is precoated with a suitable sealer to facilitate bonding of the insulant thereto.

Suitable provision is made in the design of the mold and the injection apparatus to reduce the chances for voids being formed in the insulant as it sets and to prevent detrimental changes in the properties of the insulant during cooling. The mold is removed after the insulant has properly set. Then a grounding layer, electrically connected to the metal sheaths of the cable, is applied over the newly-formed insulant.

It is highly desirable that there be some provision for checking the newly-made splice to determine whether it has the desired electrical properties, such as a sufficiently high withstand voltage and sufficiently high corona-inception and corona-extinction voltages. The usual way of making this check is by applying a high potential between the conductor of the cable and the grounding layer surrounding the splice and noting through suitable instrumentation whether any breakdown or corona occur.

A disadvantage of the typical cable splice described hereinabove is that applying a high potential across the insulant results in electrical stress being applied to insulation throughout the cable, not merely that within the splice. This can be harmful because the original cable insulation may have previously deteriorated in service, and the high potential can produce further deterioration or even a failure of the original insulation.

SUMMARY

Thus, an object of our invention is to construct the cable splice in such a way that insulant within the splice can be checked by means of a high potential applied thereto without stressing the previously-existing cable insulation in locations outside the splice.

Another object is to construct the splice in such a way and to conduct the high potential and corona tests in such a way that an a.c. testing source of low power rating can be utilized for performing the tests. This is in distinct contrast to the conventional approach of conducting such tests either with a high-power a.c. source or a low-power d.c. source. If an a.c. testing source is utilized, it is required to have a high power rating in order to charge the usually-large cable capacitance within less than one-half cycle. If a d.c. testing source is utilized, there is no such short-time limitation, thus permitting a source of low power rating to be used; but d.c. is not as accurate as a.c. in providing an indication of corona-producing voids in the insulation.

Another object is to construct the cable splice in such a way that it can be periodically checked for corona while the cable is energized and in service.

In carrying out the invention in one form, we mold about suitably prepared ends of the two cable sections being joined a tubular section of insulant having a tubular metal sleeve imbedded in the insulant near its outer periphery. The insulant has a first external surface portion surrounding the imbedded sleeve and second and third surface portions extending, respectively, between the ends of the first surface portion and the metal sheaths of the cable sections. Tubular metal shielding is applied to the first external surface portion so as to surround the ends of the imbedded sleeve and extend axially outward past said sleeve ends. On the second and third surface portions, we provide coatings of semi-conductive grading material that, respectively, electrically interconnect the shielding and the metal sheaths of the cable sections. The electrical properties of the splice are then tested by applying a high potential test voltage between the imbedded sleeve and the cable conductor while the cable conductor and cable sheaths are maintained at ground potential and the shielding is maintained at substantially the potential of the imbedded sleeve. After this testing, low resistance electrical connections are provided between the shielding and the metal sheaths.

BRIEF DESCRIPTION OF DRAWINGS

For a better understanding of the invention, reference may be had to the following description taken in conjunction with the accompanying drawings, wherein.

DETAILED DESCRIPTION OF PREFERRED EMBODIMENT

Figure 1:
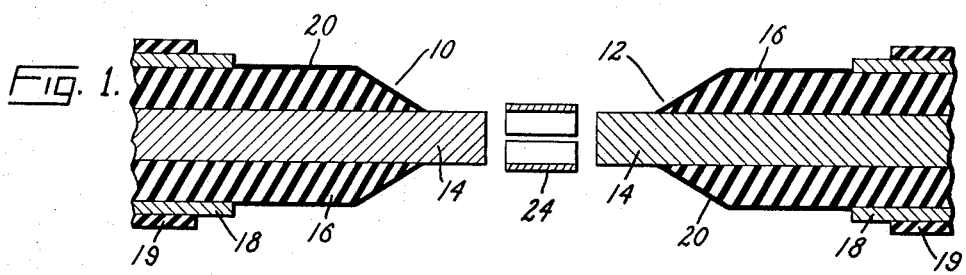
FIG. 1 is a sectional view showing two cable sections that are to be joined together by a splice embodying one form of our invention.

Referring now to FIG. 1, the two cable sections that are to be joined together are designated 10 and 12. Since these cable sections are substantially identical, identical reference numerals are used for corresponding parts of each. Each cable section comprises a conductor 14, insulation 16 surrounding the conductor, and a tubular metal sheath 18 surrounding the insulation 16. Sheath 18 can be either of a sheet or braided construction. A suitable protective covering 19 of nonmetallic material surrounds the sheath 18. Each cable section, as seen in FIG. 1, has been prepared for formation of the splice by removal of insulation 16 from its end to provide an exposed conductor end portion, by removal of some of the metal sheath 18 to provide exposed insulation 16 projecting past the end of the metal sheath, and by removal of some of the protective covering 19 to expose the end of metal sheath 18. If the insulation 16 is of oil-impregnated paper, its exposed surfaces are coated with a suitable sealer to provide a thin sealing layer 20 that serves to prevent seepage of oil from the insulation and serves also to provide high affinity with the insulant to be applied later. If the insulation 16 is of a conventional plastic material, it can be left bare.

The ends of conductors 14 of the two cable sections are then brought together, and, in a conventional manner, a tubular metal coupling 24, in the form of a split sleeve, is crimped about their exposed ends to form a good electrical and mechanical joint therebetween. The resulting assembly is then placed in the mold 26 of FIG. 2. The mold is a two-part mold, the parts of which can be easily assembled to facilitate placement of the mold about the cable and can be easily disassembled to permit its being removed after the splice is formed. The seam (not shown) between the two mold parts is located in a plane containing the cable center-line and extending perpendicular to the plane of FIG. 2.

Figure 2:
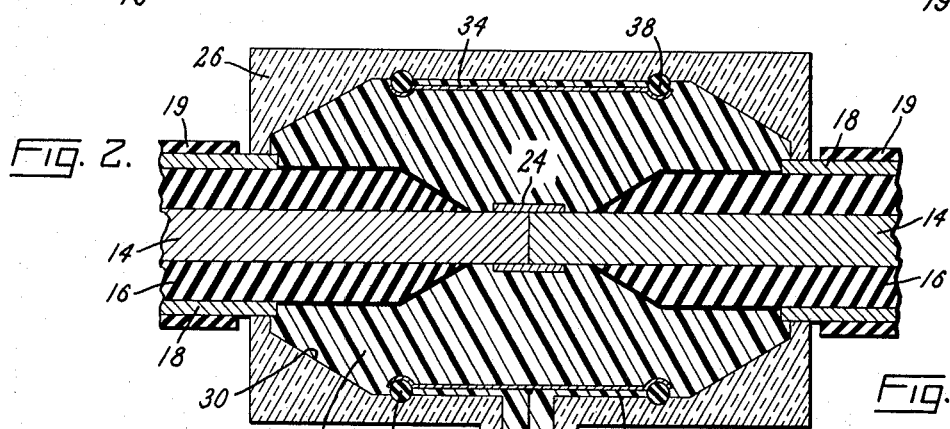
FIG. 2 shows the cable sections positioned within a mold and the insulant of the splice filling the mold.
Figure 2A:
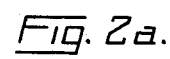
FIG. 2a is an enlarged view of a portion of FIG. 2.

The mold 26 has a cavity 30 which, when the mold is positioned as shown in FIG. 2, encompasses the ends of the tubular metal sheaths 18 and all of the exposed cable structure located between these spaced-apart ends of sheaths 18. with the mold so positioned, hot thermoplastic insulant in fluid form is injected into the mold cavity 30 through a suitable port 32 until it fills the cavity 30 and the port 32. Upon cooling, the insulant sets and bonds to the exposed metal conductor structure 14, 24 and to the exposed insulation 16, 20 of the cable sections, thus forming a tubular section 31 of insulant around these parts. Any suitable type of thermoplastic that is compatible with the insulation of the cable sections may be used. For example, polyethylene can be used where the cable insulation 16 is of polyethylene.

For reasons soon to be explained, at a time prior to the above-described filling of the mold, we provide within the mold cavity 30 a tubular metal sleeve 34 that surrounds the exposed conductor ends in radially-spaced relationship thereto and is spaced from the metal sheaths 18. This metal sleeve 34 is suitably perforated so that the injected insulant can easily pass therethrough when in the fluid form during the above-described mold-filling operation. Prior to the filling operation, sleeve 34 is held in place within the mold cavity by a pair of rings 38 of electrical insulating material, each of which fits in a circular groove in the inner peripheral wall of the mold. The sleeve 34, adjacent its ends, has grooves in its outer periphery that align with the grooves in the mold also to receive the insulating rings 38. The injected insulant fills the entire mold cavity, completely imbedding the metal sleeve 34 within the insulant. After the mold 26 is removed, the rings 38 project slightly above the insulant surface. Preferably, these projections are then removed by suitable mechanical means, such as a sharp instrument.

The ends of the sleeve 34 are shaped not only to provide grooves for receiving rings 38, as above-described, but also are rounded so as to reduce to an innocuous level electrical stress concentrations at the edge of the sleeve during certain electrical testing operations soon to be described. To further facilitate these test operations, we provide the sleeve 34 with a conductive lead 40 that was permanently attached thereto before the mold-filling operation. This lead 40 projects radially outward from the sleeve 34 through the insulant 42 that is located within port 32.

Figure 3:
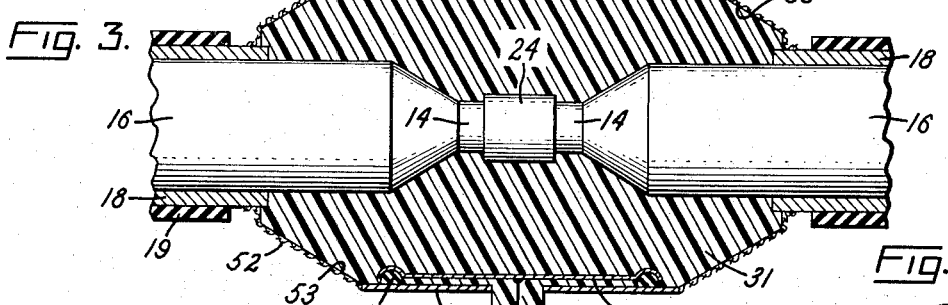
FIG. 3 shows the splice after removal from the mold but still at an intermediate stage of its manufacture.
Figure 3A:
FIG. 3a is an enlarged view of a portion of FIG. 3.

After removal of the mold 26, metal shielding 50 of tubular form (shown in FIG. 3) is applied to the cylindrical outer surface of the insulant 31 in a position to surround the sleeve 34. This shielding 50 extends axially of the splice past the ends of sleeve 34 and is locally insulated from each end of the sleeve 34 by insulant surrounding the sleeve. The shielding is preferably in the form of a thin metal tape wrapped repetitively and tightly about the cylindrical outer surface of the insulant section 31.

After the shielding 50 is in place, the outer edges of the shielding are connected to the metal sheaths 18 of the adjacent cable sections by semiconductive voltage-grading material, preferably in the form of a highly-resistive tape 52 wound about the tapered outer surfaces 53 of the insulant. This tape can be of asbestos or of a semiconductive rubber.

The splice is then ready for a check of its electrical properties. Such a check is performed by applying a high potential across the insulant 31 while the conductor 14 and the sheaths 18 are connected to ground. The high voltage terminal of a high potential alternating current test source (not shown) is connected to conductive lead 40 and also to tubular shielding 50, thus maintaining the shielding 50 and sleeve 34 at essentially the same potential during this electrical test. The high potential that is applied between the outer parts 34, 50 and the conductor 14 imposes upon the insulant 31 of the splice sufficiently high electrical stresses to permit one to determine whether the splice has the desired high withstand voltage and corona-inception and corona-extinction voltages. Suitable instrumentation (not shown) connected to conductive lead 40 indicates whether any corona or breakdowns occur at the test voltages.

A special advantage of our cable splice is that these high-potential and corona tests can be performed without subjecting the previously-existing cable insulation to the high potential. In this respect, note that since both the sheaths 18 and the conductor 14 are at ground potential during these tests, none of the cable insulation located between these parts 18 and 14 is stressed by the high potential.

The high-resistance coating 52 on the tapered external surfaces 53 of the insulant serves to grade the voltage along these surfaces during the high-potential and corona tests in such a way as to reduce electrical stress concentrations along these surfaces, thus serving to prevent any electrical breakdowns or corona along these surfaces. The voltage grading effect of the coatings 52 also serves to reduce the electrical stress concentrations in the interior regions of the insulant that are bounded by and generally axially aligned with said second and third surfaces, thus reducing the likelihood of corona in these regions. Because sleeve 34 has rounded edges, as previously described, electrical stresses adjacent these edges are held to an innocuous level during the high-potential and corona tests. The insulant that is located between shields 50 and sleeve 34 is not significantly stressed by these high-potential and corona tests because during the tests, these parts 50 and 34 are electrically connected together, and therefore at substantially the same potential. In general, only the insulant in the region between sleeve 34 and the conductor 14 is subjected to the desired high stress during the above-described high-potential and corona tests.

Another advantage of our cable splice is that we can perform our tests with an a.c. source of relatively low power rating. Since, in general, we apply our test voltage only across the insulant of the splice, we are dealing only with a low value of capacitance which can easily be charged within one-half cycle by the low-power a.c. test source. If the test had been performed by the prior technique of applying high potential to the cable conductor 14 while maintaining the cable sheath 18 and the outer surface of the splice grounded, then the capacitance of the entire cable between its conductor and sheath would have to be charged before a sufficiently high test voltage could be developed across the insulant. This has generally required that the test source be a high-power a.c. source in order to charge the large capacitance within one-half cycle or has required that the source be a d.c. source. Using a d.c. source is disadvantageous because d.c. is not as accurate as a.c. in providing an indication of corona-producing voids in the insulation. With d.c., there is an accumulation of charge within the voids that tends to suppress further discharges, making it more difficult to detect the presence of such voids.

Figure 4:
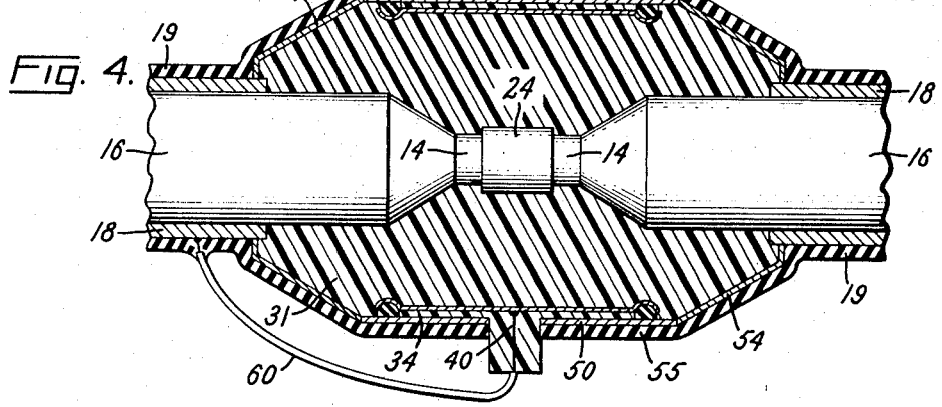
FIG. 4 shows the splice after it has been completed.

If the high-potential and corona tests are satisfactory, the semiconductive tape 52 is removed and the sheaths 18 are connected to the shielding 50 by permanent low resistance connections, e.g., metal tape 54 applied to the tapered surfaces of the splice. In some cases, it is satisfactory to leave the semiconductive tape 52 in place and apply the metal coating over this tape. In either case, the metal shielding 50 is electrically connected to the sheaths 18 through low resistance connections. A suitable protective layer 55 (FIG. 4) of nonmetallic material is then applied over the entire splice, except for the lead 40, so as to provide protection against corrosion and abrasion. Then the lead 40 is electrically connected to metal sheath 18 by a conductor 60, which is wrapped with suitable insulating tape to protect it from chemical or mechanical damage. The connection between lead 40 and sheath 18 is of such a nature that it can readily be broken to provide for in-service testing, as explained in the following paragraph.

If it is desired to check the splice for corona while the cable is in service, this can be accomplished simply by breaking the connection between lead 40 and sheath 18 and by suitably connecting a corona-detecting instrument (not shown) between sheath 18 and the lead 40. This corona detecting instrument responds to the voltage present between sleeve 34 and shield 50. This voltage will have a wave form that corresponds to the voltage present between conductor 14 and sleeve 34 and will contain a radio frequency component characteristic of corona if any corona is present between sleeve 34 and conductor 14. The connection between lead 40 and sheath 18 can conveniently be broken at a point along the length of conductor 60, or, if desired, at either end of conductor 60. After the in-service test has been completed, the connection between lead 40 and sheath 18 can be restored.

In the preferred form of our invention described hereinabove, voltage-grading along each of the tapered surfaces 53 is effected by a semiconductive coating 52 applied to the entire surface 53. It is to be understood, however, that our invention in its broader aspects comprehends other forms of voltage-grading means on the surfaces 53 which are effective during the application of the test voltage to reduce electrical stress concentrations on the surfaces 53 and in the portions of the insulant bounded by and generally axially aligned with surfaces 53. As examples of other such voltage-grading means, the semiconductive coatings can be terminated short of the sheaths 18; or, instead of the coatings 52, axially spaced conductive rings coaxial with conductor 14 can be applied to the surfaces 53 to provide capacitive type voltage grading. If desired, suitable values of capacitance can be connected between such rings.

While we have shown and described a particular embodiment of our invention, it will be obvious to those skilled in the art that various changes and modifications may be made without departing from our invention in its broader aspects, and we, therefore, intend in the appended claims to cover all such changes and modifications as fall within the true spirit and scope of our invention.

We claim:

1. A method of making a splice between two cable sections, each of which comprises: a conductor, electrical insulation surrounding the conductor, and a tubular metal sheath surrounding said insulation, the conductor having an exposed end extending beyond the end of said insulation and the insulation having an exposed end extending beyond the end of said sheath; said method comprising the steps of:

a. electrically and mechanically joining the exposed ends of the two conductors, b. molding about said exposed conductor ends and said exposed insulation ends a tubular section of insulant, near the outer periphery of which is located a tubular metal sleeve that is imbedded within said insulant, surrounds said exposed conductor ends in radially-spaced relationship thereto, and is spaced from said metal sheaths; said tubular section of insulant having a first external surface portion surrounding said sleeve and second and third external surface portions extending, respectively, between the ends of said first external surface portion and said metal sheaths, c. applying to said first external surface portion tubular metal shielding that surrounds the ends of said sleeve and extends axially outward past said sleeve ends, d. providing on said second and third external surface portions voltage-grading means acting when the test voltage of (e) is applied to reduce the electrical stress concentrations on said second and third surface portions and in the portions of insulant bounded by and generally axially aligned with said second and third surface portions, e. testing the electrical properties of said splice by applying a high-potential test voltage between said sleeve and said conductors while said conductors and said sheaths are maintained at a potential near ground potential and said shielding is maintained at substantially the potential of said sleeve, f. and, after said testing, providing low resistance connections between said shielding and said metal sheaths.

2. The method of claim 1 in which said voltage-grading means comprises coatings of voltage-grading material that, respectively, electrically interconnect said shielding and said sheaths.

3. The method of claim 1 in which:
   a. said tubular section of insulant is provided with a conductive lead that is electrically connected to said metal sleeve and extends generally radially outward therefrom through insulant external to said sleeve,
   b. said testing is effected by connecting a high potential to said lead,
   c. and said lead is electrically connected to one of said metal sheaths after said testing.

4. The method of claim 3 in which said lead is detachably connected to said one metal sheath, thereby allowing said connection to be broken so that:
   a. said sleeve can assume a different potential from said sheath while said conductor is energized and
   b. a voltage-measuring device can be connected between said lead and said one sheath to detect corona in said splice.

5. The method of claim 1 in which:
   a. prior to said molding step, said tubular metal sleeve is positioned around said exposed conductor ends and within a mold having a generally cylindrical interior surface and is maintained spaced from said cylindrical surface by electrical insulating members provided between the outer periphery of the sleeve and said cylindrical surface,
   b. insulant in fluid form is injected into said mold to fill the spaces within said mold internally and externally of said sleeve,
   c. and thereafter said insulant is allowed to set and form within said mold said tubular section of insulant with said sleeve imbedded therein.

6. The method of claim 5 in which:
   a. said sleeve is perforated, and
   b. insulant is injected into the mold from a point radially outside said sleeve and through the perforations in said sleeve.

7. A splice joining two cable sections, each comprising: a conductor, electrical insulation surrounding the conductor, and a tubular metal sheath surrounding said insulation, the conductor having an exposed end extending beyond the end of said insulation and the insulation having an exposed end extending beyond the end of said sheath; said splice comprising:
   a. means electrically and mechanically joining the exposed ends of the two conductors,
   b. a tubular section of insulant surrounding said exposed conductor ends and said exposed insulation ends and bonded thereto,
   c. a metal sleeve imbedded within the insulant of said tubular section near the outer periphery of said insulant, said sleeve surrounding said exposed conductor ends in radially-spaced relation thereto and being spaced from said metal sheaths,
   d. said tubular section of insulant having a first external surface portion surrounding said sleeve and second and third external surface portions extending, respectively, between the ends of said first external surface portion and said metal sheaths,
   e. metal shielding on said first external surface portion surrounding and extending axially outwardly past the ends of said sleeve but being separated from said sleeve by the insulant of said tubular section of insulant,
   f. voltage-grading means on said second and third external surface portions for reducing the electrical stress concentrations on said second and third surface portions when a test voltage is applied between said metal shielding and said sheaths while said sheaths are near ground potential,
   g. and a conductive lead electrically connected to said sleeve and extending through insulant external to said sleeve for providing a connection through which high potential can be applied to said sleeve for electrically testing said insulant section.

8. The splice of claim 7 in which said voltage-grading means comprises coatings of semiconductive voltage-grading material that, respectively, electrically interconnect said shielding and said sheaths.

9. The splice of claim 7 in combination with means electrically interconnecting said lead and said shielding during electrical testing of said insulant.

10. The splice of claim 7 in which said metal sleeve has at its opposite ends edges that are imbedded in said insulant and are rounded to reduce electrical stress concentrations thereadjacent when a high potential is applied to said sleeve during said electrical testing.

11. A splice joining two cable sections, each comprising: a conductor, electrical insulation surrounding the conductor, and a tubular metal sheath surrounding said insulation, the conductor having an exposed end extending beyond the end of said insulation and the insulation having an exposed end extending beyond the end of said sheath; said splice comprising:
   a. means electrically and mechanically joining the exposed ends of the two conductors,
   b. a tubular section of insulant surrounding said exposed conductor ends and said exposed insulation ends and bonded thereto,
   c. a metal sleeve imbedded within the insulant of said tubular section near the outer periphery of said insulant, said sleeve surrounding said exposed conductor ends in radially spaced relation thereto and being spaced from said metal sheaths,
   d. said tubular section of insulant having a first external surface portion surrounding said sleeve and second and third external surface portions extending, respectively, between the ends of said first external surface portion and said metal sheaths,
   e. metal shielding on said first external surface portion surrounding and extending axially outwardly past the ends of said sleeve but being separated from said sleeve by the insulant of said tubular section of insulant,
   f. low resistance electrical connections between said shielding and said metal sheaths,
   g. and a conductive lead electrically connected to said sleeve, extending through insulant external to said sleeve, and electrically connected to one of said metal sheaths.

12. The splice of claim 11 in which said conductive lead is detachably connected to said metal sheath, thereby allowing said connection to be broken so that:
 a. said sleeve can assume a different potential from said sheath while said conductor is energized and
 b. a voltage-measuring device can be connected between said lead and said one sheath to detect corona in said splice.

* * * * *